W. A. GUENTHER.
MEAT CONVEYER.
APPLICATION FILED SEPT. 8, 1909.
941,248.
Patented Nov. 23, 1909.
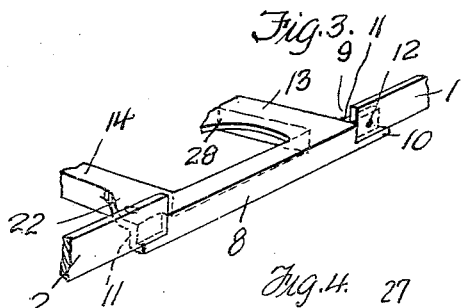
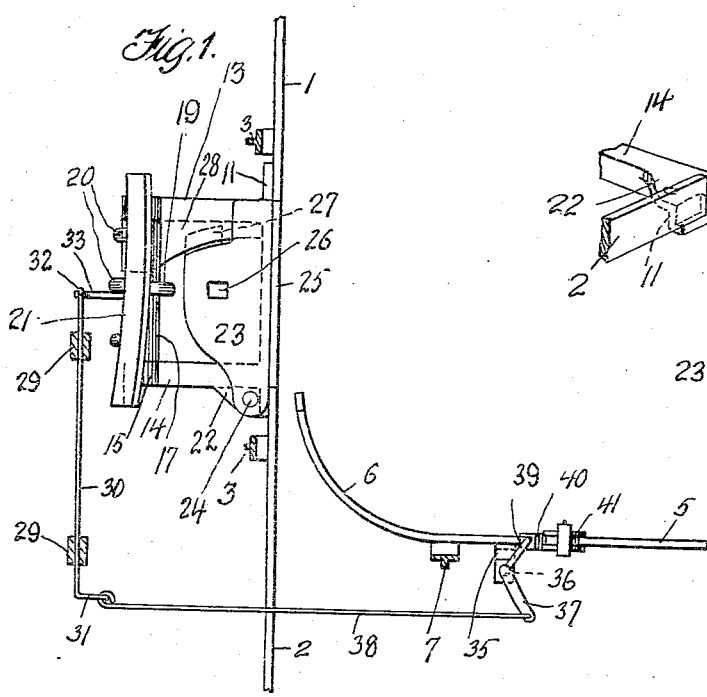
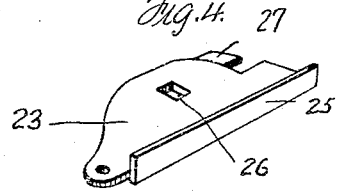
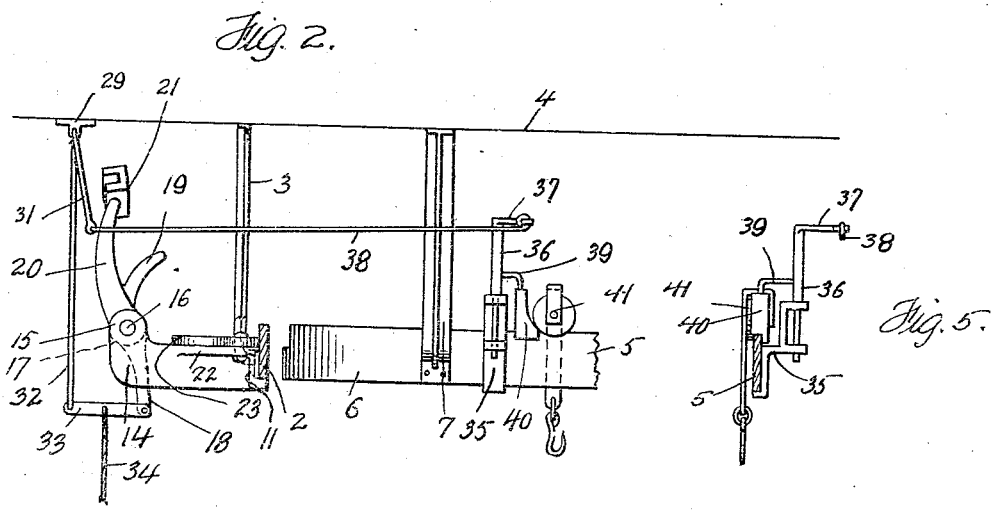
WITNESSES:—
INVENTOR
WILLIAM A. GUENTHER.
BY
ATTORNEYS.

UNITED STATES PATENT OFFICE.

WILLIAM A. GUENTHER, OF PITTSBURG, PENNSYLVANIA.

MEAT-CONVEYER.

941,248.

Specification of Letters Patent.

Patented Nov. 23, 1909.

Application filed September 8, 1909. Serial No. 516,771.

*To all whom it may concern:*

Be it known that I, WILLIAM A. GUENTHER, a citizen of the United States of America, residing at Pittsburg, in the county of Allegheny and State of Pennsylvania, have invented certain new and useful Improvements in Meat-Conveyers, of which the following is a specification, reference being had therein to the accompanying drawing.

This invention relates to meat conveyers, and the invention has for its object to provide a safety appliance for preventing meat from being soiled or ruined by being accidentally dropped from a switch gap in the conveyer.

My invention aims to provide a safety appliance that can be advantageously used in the storage refrigerators of large commission houses or agency plants, where a large amount of meat is moved on overhead conveyers. Since these overhead conveyers are arranged to provide storage tracks and main switching tracks, it is necessary to use numerous switches to facilitate the shifting of meat, and in connection with these switches considerable trouble is experienced by workmen neglecting to observe the position of a switch before shifting a piece of meat onto the switch. If the switch is open, the meat and carrier are immediately precipitated upon the floor and very often the carrier is broken and the meat soiled. It is such defects in connection with the overhead conveyers that my invention aims to obviate by providing branch or storage rails, or even a main rail with a safety appliance, comprising a block adapted to be simultaneously operated with the switch, the block being thrown into the path of the carrier on a storage rail to chuck the carrier and prevent the same from running into the gap of the switch.

The invention will be hereinafter considered in detail and then claimed, and reference will now be had to the drawing forming a part of this specification, wherein I have illustrated what I believe to be a practical embodiment of my invention; but I desire it to be understood that the structural elements thereof are susceptible to changes in the size, proportion and manner of assemblage without departing from the spirit of the invention.

In the drawings:—Figure 1 is a plan of a portion of the meat conveyer equipped with a safety appliance constructed in accordance with my invention, Fig. 2 is a side elevation of the same, Fig. 3 is a perspective view of a portion of the main track, Fig. 4 is a similar view of a detached switch tongue, and Fig. 5 is an end view of the safety appliance.

In the drawing, the reference numerals 1 and 2 denote the confronting ends of a main track which is supported by hangers 3 suspended from a ceiling or overhead structure 4.

5 denotes what I term a "storage" track having a curved end 6 in proximity to the end of the track 2, the track 5 being arranged at right angles to the track 2 and supported by hangers 7 similar to the supports of the tracks 1 and 2.

8 denotes a track member arranged between the confronting ends of the tracks 1 and 2, said member being of less depth than the tracks to provide a gap 9. The member 8 extends under the ends of the tracks 1 and 2, as at 10 and the extending ends are provided with vertical flanges 11 which are riveted or otherwise secured to the tracks 1 and 2, as at 12. The outer side of the member 8 is provided with parallel lateral extensions 13 and 14 and the outer ends of these extensions are provided with bearings 15 for a longitudinal pin 16. Pivotally mounted upon the pin 16 is a sleeve 17 having a central depending crank 18, a central upwardly extending crank 19 and two upwardly extending curved arms 20, these arms being located adjacent to the ends of the sleeve 17. The upper ends of the arms are connected by a curved switch tongue 21 which is adapted to fit between the rails 1 and 5 and bridge the gap between the end of the rail 1 and the curved end 6 of the rail 5. The extension 14 of the member 8 is provided with a side bearing 22 for a horizontal shiftable switch tongue, comprising a plate 23 pivotally connected to the side bearing 22 by a pin 24. The plate 23 is provided with a longitudinal vertical flange 25 adapted to bridge the gap 9 between the rails 1 and 2. The plate 23 is also provided with an opening 26 adapted to receive the crank 19, and with a projecting lug 27 adapted to extend under a guide flange 28 carried by the extension 13. The lug 27 prevents the plate 23 from rising when actuated by a movement of the crank 19, as will hereinafter appear.

The ceiling or overhead structure 4 is provided with hangers 29 for a shaft 30, said shaft having the ends thereof provided with cranks 31 and 32, the latter being of a greater length than the former whereby it can be pivotally connected by a link 33 to the crank 18. The link 33 is provided with a depending cable or rod 34 adapted to be used when operating the switch and my safety appliance.

The rail 5 adjacent to the curved end 6 is provided with an off-set bearing 35 for a vertical shaft 36. The upper end of the shaft is provided with a crank 37 adapted to be connected by a rod 38 to the crank 31. The shaft 36 is also provided with a hanger 39 for a chuck block 40 adapted to engage the rail 5 and prevent the movement of a carrier 41 upon said rail toward the curved end 6 thereof.

As shown in Fig. 1 of the drawing, the plate 23 is in position for the flange 25 thereof to close the gap 9 and provide a straightway track. With the plate 23 in this position the chuck block 40 is in the path of the carrier 41 and prevents the movement of the carrier toward the gap between the rail 1 and the curved end 6 of the rail 5. When it is desired to transfer the carrier 41 from the rail 5 to the rail 1, the operator pulls upon the cable or rod 34 in the direction of the arrow of Fig. 2. Simultaneously with a movement of the sleeve 17 through the medium of the crank 18, the shaft 30 is rocked and through the medium of the connecting rod 38 partially rotates the vertical shaft 36, swinging the chuck block 40 away from the rail 5 and providing clearance for the carrier 41. When the sleeve 17 is moved the curved crank 19 is swung into the opening 26 of the plate 23, causing said plate to shift toward the sleeve and provide the gap 9. Simultaneously with this movement of the plate 23, the arms lower the switch tongue 21 into the gap 9, and as this switch tongue is curved, it fills the gap between the rail 1 and the curved end 6 of the rail 5, thus providing a passage for the carrier 41 to the rail 1.

By pulling the cable or rod 34 in the opposite direction, the plate 23 can be replaced whereby the carrier can be shifted from the rail 1 to the rail 2. In the meantime, the chuck block is replaced to prevent another carrier from approaching the switch until it has been properly positioned for the transfer of the carrier.

My invention particularly resides in elements 35 to 40 inclusive, and I reserve the right to use these elements in connection with switches of various types.

Having now described my invention what I claim as new, is:—

1. In an overhead conveyer, the combination with a main track, a side track, and a switch controlling the passage of a carrier from the side track to the main track, of a bearing carried by the side track and offset therefrom, a shaft mounted for partial rotation in the bearing, said shaft extending above the side track and provided on its upper end with a crank, connections between said crank and the switch for rocking the shaft as the switch is moved, and a chuck block carried by the shaft and movable therewith into position on the side track, or to one side thereof according to the direction of rotation of the shaft.

2. In an overhead conveyer, the combination with a main track, a side track, and a switch controlling the passage of a carrier from the side track to the main track, of a bearing carried by the side track and offset therefrom, a shaft mounted for partial rotation in the bearing, said shaft extending above the side track and provided on its upper end with a crank, connecting rods between the crank and the switch for imparting partial rotary movement to the shaft as the switch is actuated, a laterally-extending hanger carried by said shaft, and a chuck block suspended from said hanger, said chuck block and hanger movable with the shaft whereby the chuck block is moved into position onto the side track or to one side thereof according to the direction of the movement imparted to the shaft.

In testimony whereof I affix my signature in the presence of two witnesses.

WILLIAM A. GUENTHER.

Witnesses:
A. H. Rabsag,
Max H. Srolovitz.